United States Patent Office 2,736,744
Patented Feb. 28, 1956

2,736,744
PURIFICATION OF α-CHLOROACRYLIC ACID DERIVATIVES

John William Croom Crawford, Welwyn Garden City, England, and John Segrue Secker, Belfast, Northern Ireland, assignors to Imperial Chemical Industries Limited, a corporation of Great Britain No Drawing. Application February 5, 1952,
Serial No. 270,117
Claims priority, application Great Britain
September 4, 1950
8 Claims. (Cl. 260—486)

This invention relates to improvements in the manufacture of resinous products obtained from the lower alkyl esters of α-chloroacrylic acid, by which is meant esters of α-chloroacrylic acid and aliphatic monohydric alcohols containing not more than four carbon atoms. The application is a continuation-in-part of our copending U. S. application, Serial No. 243,602 filed August 24, 1951, and now abandoned.

In many cases the appearance of polymers of these esters is marred by a yellowish colouration even when the esters from which they are prepared are carefully purified and are colourless. The yellow colour is sometimes apparent immediately on polymerisation, while in other cases only after a lapse of time or when the materials are heated. The formation of this yellow colour is believed to be due to the presence of autoxidation products of the monomer.

The object of the present invention is to provide a process for the production of lower alkyl esters of α-chloroacrylic acid which, on polymerisation, yield polymers having good colour initially and a reduced tendency to develop colour over long periods of time.

In our copending U. S. application, Serial No. 243,602 filed August 24, 1951, and now abandoned, there is described a process for the purification of lower alkyl α-chloroacrylates prepared by reacting formaldehyde or a polymer thereof with trichloroethylene in the presence of sulphuric acid and heating the reaction mixture in the presence of an alcohol or an alkyl hydrogen sulphate. In this process, the undesirable yellow colour usually observed in lower alkyl α-chloroacrylates prepared by the above method is removed by mixing the alkyl α-chloroacrylate with hydrazine, hydrazine hydrate or a hydrazine derivative in which one or both of the hydrogen atoms of one of the —NH₂ groups in the hydrazine molecule is or are replaced by a radical or radicals from the classes consisting of alkyl, cycloalkyl and aryl radicals, substituted radicals of these classes, and acyl groups having the formula R.CO— in which R is an organic radical, an —NH₂ group or molecule is or are replaced by a radical or radicals from the classes consisting of alkyl, cycloalkyl and aryl radicals, substituted radicals of these classes, and acyl groups having the formula R.CO— in which R is an organic radical, an —NH₂ group or an —NH₂ group in which one or both of the hydrogen atoms has or have been substituted by an organic radical or radicals, and subsequently separating the alkyl α-chloroacrylate by distillation or steam distillation.

We have now found that when a lower alkyl α-chloroacrylate as normally prepared, regardless of its method of preparation and of whether it possesses an undesirable colour, is subjected to the process of copending U. S. application, Serial No. 243,602 filed August 24, 1951 and now abandoned, the aforesaid object of the present invention is achieved provided that a hydrazine derivative is used in which one or both of the hydrogen atoms of one of the —NH₂ groups is or are substituted by R.CO-groups.

According to the present invention, therefore, we provide a process which comprises mixing and subsequently separating by distillation or steam distillation, a lower alkyl ester of α-chloroacrylic acid as normally prepared and a hydrazine derivative having one or both of the hydrogen atoms of one of the —NH₂ groups in the hydrazine molecule replaced by an acyl group of the formula R.CO— where R is an organic radical, an —NH₂ group or an —NH₂ group having one or both of the hydrogen atoms replaced by an organic radical.

The invention also comprises the production of polymers by subjecting lower alkyl esters of α-chloroacrylic acid treated in this manner to polymerisation conditions.

The hydrazine derivatives which may be used in the present invention include, for example, semicarbazide, benzoyl hydrazine, unsym. dibenzoyl hydrazine, malonyl dihydrazine, isobutyryl hydrazine, unsym. diisobutyryl hydrazine, acetyl hydrazine, unsym. diacetyl hydrazine, phenyl semicarbazide and diphenyl semicarbazide.

Semicarbazide is particularly suitable and easily available. It suffers from a slight disadvantage in being rather unstable, but it can readily be prepared in solution, as and when required, by mixing the more stable hydrochloride with a solution of caustic potash in methanol and, if desired, filtering off the potassium chloride. Benzoyl hydrazine is also very suitable, being a crystalline material which is easily prepared, isolated and stored and which may be used in the pure state if desired.

The amount of the hydrazine derivative required depends upon the previous history of the alkyl α-chloroacrylate undergoing treatment. For example, a sample which has been exposed to air or oxygen for prolonged periods, particularly if it has also been exposed to ultraviolet or visible light, will require the use of more hydrazine derivative than one which has not. The amount of the hydrazine derivative required usually does not exceed 2.0% based on the weight of the alkyl α-chloroacrylate, although larger amounts may be used if desired. Satisfactory results are frequently obtained by the use of an amount of about 0.1 to 1.0% based on the weight of the alkyl α-chloroacrylate.

The hydrazine derivative may be added to the alkyl α-chloro acrylate at room temperature in the substantially pure state, or dissolved in a suitable solvent, such as, for example, ether or methanol, concentrations of about 10% by weight being found convenient in practice. It is found that if an ester to which the hydrazine derivative has been added is allowed to stand for some time, varying with the hydrazine derivative used, a yellow or brown colour sometimes develops. Nevertheless, on distillation a colourless ester is obtained and in such cases it is, in fact, possible to take the development of colour as an indication that distillation may be started. It is not essential to allow the mixture to stand after adding the hydrazine derivative, however, since, if sufficient of the latter is added, distillation of the alkyl α-chloroacrylate may be commenced immediately after the addition is complete and a product still obtained which gives a polymer of improved colour and colour-stability. On the other hand, when the hydrazine derivative is used in small amounts, e. g. less than about 1.0% based on the weight of the alkyl α-chloroacrylate, it may be necessary to allow the mixture to stand for a considerable time, e. g. several hours, in order to obtain the full advantage from the treatment.

After separation from the hydrazine derivative, the alkyl α-chloroacrylate is preferably stored out of contact with air and preferably also in the dark until it is polymerised. Air is preferably also excluded during the polymerisation. In order to reduce the danger of the alkyl α-chloroacrylate undergoing autoxidation after treatment with the hydrazine derivative, it is advisable to carry out this treatment as shortly as possible before the alkyl α-chloroacrylate is to be polymerised.

Suitable polymerisation conditions for the production of polymers from the treated alkyl α-chloroacrylate include the influence of heat and, in combination therewith or separately, the influence of actinic light. The polymerisation may also be promoted by the presence of polymerisation catalysts.

The present invention is particularly important in its application to methyl α-chloroacrylate in view of the suitability of this material in the polymerised form for use in windows, roof-lights, windshields, aircraft cockpit covers and similar applications where freedom from colour is of great importance.

The invention is illustrated but not limited by the following examples in which all parts are by weight.

*Example I*

500 parts of yellow distilled methyl α-chloroacrylate prepared by the method of British specification No. 550,854 were treated with 100 parts of a 10% methanolic solution of semicarbazide and then with 0.1 part of tertiary butyl catechol as polymerisation inhibitor. The mixture was allowed to stand for 15 hours and the now orange-yellow liquid distilled in an atmosphere of nitrogen. The total distillate was entirely colourless. A sample of ester (boiling point 56°/50 mm.) was sealed off under nitrogen, and after photopolymerisation (without catalyst) and heat treatment at 120° C. for 24 hours gave a colourless resin.

*Example II*

200 parts of yellow distilled methyl α-chloroacrylate prepared by the method of British specification No. 550,854 were treated with 10 parts of a 10% solution of benzoyl hydrazine in methanol and then with 0.1 part of tertiary butyl catechol as polymerisation inhibitor. The mixture was allowed to stand for 15 hours and the now yellow liquid was distilled under nitrogen. The distillate was entirely colourless. A sample of the distillate (boiling point 57°/53 mm.) was sealed off under nitrogen, and after photopolymerisation and heat treatment at 120° C. for 24 hours, gave a colourless resin.

*Example III*

100 parts of colourless distilled monomer (which had been exposed to oxygen and light, and would on polymerisation have yielded a brown resin) were treated with 5 parts of a 10% methanolic solution of semicarbazide, and then with 0.1 part of tertiary butyl catechol as polymerisation inhibitor. The mixture was allowed to stand for 15 hours and the still colourless liquid distilled under nitrogen. The distillate was entirely colourless. A sample polymerised out of contact with air, and subjected to a heat treatment at 120° C. for 24 hours, gave a colourless resin.

*Example IV*

250 parts of colourless distilled monomer (which had been exposed to air and light) were treated with 1 part benzoyl hydrazine, and then with 0.1 part of tertiary butyl catechol as polymerisation inhibitor. The mixture was shaken for ½ hour to dissolve the benzoyl hydrazine and allowed to stand 15 hours. The faintly buff coloured liquid was then distilled under nitrogen and a colourless distillate was obtained. A sample photopolymerised anaerobically and subjected to a heat-treatment for 24 hours gave a colourless resin.

*Example V*

400 parts yellow steam distilled methyl α-chloroacrylate prepared by the method of British specification No. 550,854 were treated with 40 parts of a 10% methanolic solution of malonyl dihydrazine,

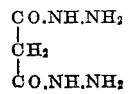

and 0.1 part of tertiary butyl catechol. The mixture immediately became colourless. It was allowed to stand for 15 hours and the still colourless liquid was distilled under nitrogen. The binary and distillate which passed over were both entirely colourless. A sample of distillate photopolymerised anaerobically and subjected to a heat treatment at 120° C. for 24 hours, gave a colourless resin.

*Example VI*

500 parts of yellow steam distilled methyl α-chloroacrylate prepared by the method of British specification No. 550,854 were shaken with 5 parts of isobutyryl hydrazine $(CH_3)_2.CH.CO.NH.NH_2$ for 5 minutes to dissolve the latter. 0.1 part of tertiary butyl catechol was added as polymerisation inhibitor. The mixture was allowed to stand for 15 hours and the pale yellow liquid distilled under nitrogen. The distillate was entirely colourless. A sample photopolymerised anaerobically and subjected to a heat treatment at 120° C. for 24 hours, gave a colourless resin.

*Example VII*

250 parts of yellow steam distilled methyl α-chloroacrylate prepared by the method of British specification No. 550,854 were treated with 25 parts of a 10% methanolic solution of acetyl-hydrazine $CH_3.CO.NH.NH_2$ and with 0.1 part of tertiary butyl catechol as polymerisation inhibitor. The mixture was allowed to stand for 15 hours and the pale yellow liquid distilled under nitrogen. The distillate was entirely colourless. A sample of the distillate photopolymerised anaerobically and subjected to a heat treatment at 120° C. for 24 hours, gave a colourless resin.

We claim:

1. A process for the purification of a lower alkyl ester of α-chloroacrylic acid regardless of the method of preparation of said ester and of whether it possesses an undesirable color, so that polymers formed from said ester will not be undesirably colored and will possess a reduced tendency to develop color over long periods of time, said process comprising mixing together said ester and a small effective amount of a hydrazine derivative selected from the group consisting of acyl derivatives of hydrazine, carbamyl derivatives of hydrazine, and carbamyl derivatives of hydrazine in which at least one of the hydrogen atoms of the carbamyl group is replaced by an organic radical, and subsequently separating said hydrazine derivative from said ester by distillation.

2. A process according to claim 1 wherein the lower alkyl ester of α-chloroacrylic acid is methyl α-chloroacrylate.

3. A process according to claim 1 wherein the amount of hydrazine derivative used does not exceed 2% of the weight of the alkyl α-chloroacrylate.

4. A process according to claim 1 wherein the amount of hydrazine derivative used is from 0.1 to 1% of the weight of the alkyl α-chloroacrylate.

5. A process according to claim 1 wherein the hydrazine derivative is added to the alkyl α-chloroacrylate in a substantially pure state.

6. A process according to claim 1 wherein the hydrazine derivative is added to the alkyl α-chloroacrylate in the form of a solution in a suitable solvent.

7. A process according to claim 1 wherein the hydrazine derivative is semicarbazide.

8. A process according to claim 1 wherein the hydrazine derivative is benzoyl hydrazine.

References Cited in the file of this patent

UNITED STATES PATENTS 2,314,443     Crawford _____ Mar. 23, 1943
2,514,305     Barnes _____ July 4, 1950